Oct. 24, 1950 A. C. CARLSON ET AL 2,526,803
DIE CLOSING MECHANISM
Filed Jan. 25, 1947 3 Sheets-Sheet 1

INVENTORS
ARTIE C. CARLSON
Fred W. Crew
BY Joseph Farley

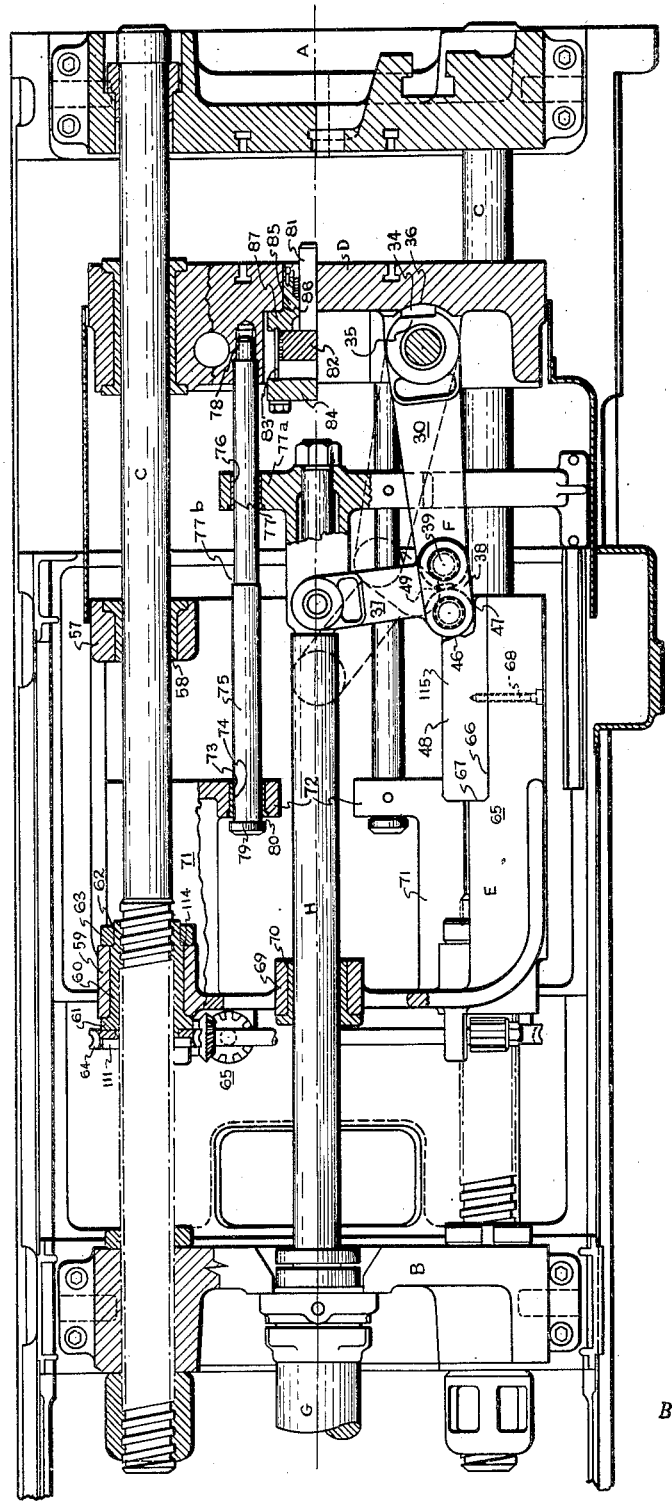

Oct. 24, 1950 A. C. CARLSON ET AL 2,526,803
DIE CLOSING MECHANISM
Filed Jan. 25, 1947 3 Sheets-Sheet 3

INVENTORS
ARTIE C. CARLSON
Fred W. Crew
BY Joseph Varley

Patented Oct. 24, 1950

2,526,803

UNITED STATES PATENT OFFICE 2,526,803

DIE CLOSING MECHANISM

Artie C. Carlson and Fred W. Crew, Detroit, Mich., assignors to Wickes Brothers, Saginaw, Mich., a corporation of Michigan Application January 25, 1947, Serial No. 724,366

17 Claims. (Cl. 18—16)

This invention relates to an injection molding machine and more particularly to that portion of the machine used for closing a pair of dies under pressure.

Normal practice in the pressure casting of metals, plastics and other materials adapted to pressure injection molding includes the use of a pair of dies which are brought together and held under heavy pressure prior to and during the injection and cooling periods. After cooling of the casting, the dies are separated, the castings removed, and a new cycle is started. In providing a machine adapted to this cycle of operation, it is general practice to use a fixed die bolster plate, a movable die bolster plate, a mechanism for moving the latter plate and movable die into engagement with the fixed die and to lock the same in such position under heavy pressure.

The die closing portion of the machine, in order to perform its function in the best possible manner, should include provision for attaining extremely accurate alignment of the dies, even pressure over the die faces which are brought into engagement and an extremely heavy die closing pressure. In addition, it is desirable that provision be made for a wide range of die opening to accommodate castings having a variety of different thicknesses as well as a wide range of adjustment for different sizes of dies.

In order to meet these requirements, a number of inherent problems are encountered. If anything other than a symmetrical framework is used to withstand the pressure exerted on the dies, there is a tendency for unequal strain in such frame to result in unequal die pressure over the engaging faces of the dies despite the most careful initial setting of the dies. Where heavy injection pressures are used, such unequal die pressure results in undesirable flash, leakage of the material, and in some cases, dangerous spurting of the hot material from between the die faces. In order to obtain symmetry in those members of the frame to which pressure is transmitted, a plurality of equally sized tie bars connecting the fixed die bolster plate and the reaction member for the movable die bolster plate are frequently used.

The conventional type of machine which uses such tie bar construction for the principal stress-carrying members is normally provided with a reaction member for the movable die bolster plate and a toggle mechanism connecting such reaction member with the movable die bolster plate. The position of such reaction member is ordinarily adjustable through individual adjustment nuts on a threaded portion of each of the tie bars and pressure transmitted from the toggle mechanism to the reaction member is in turn transmitted to the tie bars through such individually adjusted nuts. It may readily be seen that in adjusting the position of the reaction member for a given set of dies, each of the adjustment nuts must necessarily be moved to precisely the correct position in order to permit equal transmission of stress to each of the tie bars, and that in the absence of such precise adjustment, unequal stress and strain in the tie bars will result in uneven die pressure thereby negativing the advantage of the symmetrically balanced tie bar construction.

With regard to the range of die opening available for removal of the casting, the conventional use of a toggle mechanism directly connecting the movable die bolster plate and the reaction member results in certain inherent limitations. The development of heavy die locking pressures required in modern injection molding practice with moderate actuating pressures requires that a large portion of the stroke for actuating the toggle mechanism be devoted to developing the final locking pressure in order to attain sufficient mechanical advantage. The remainder of the stroke available for movement of the die is accordingly limited by this factor together with the practical dimensions of the toggle mechanism and machine. As an alternative, the use of hydraulic pressure means alone for effecting die locking pressures would avoid the opening limitations incident to the use of toggle mechanism, but would require pressures and cylinder sizes so great as not to be commercially feasible.

In order to combine the advantages of the toggle mechanism for developing final locking pressure and hydraulic action for attaining a wide range of die opening, recent developments in the art have included a die closing mechanism wherein the major portion of the die movement is accomplished by hydraulic means alone without actuation of the toggle linkage and wherein such linkage comes into action only during the final die closing portion of the cycle. Whenever, with this arrangement, the hydraulic cylinder is mounted on the adjustable reaction member, hydraulic pressure to such cylinder must be transmitted through conduits having sufficient flexibility to travel through the entire range of adjustment. Such connections under the hydraulic pressures required frequently result in the development of leakage necessitating replacement or repair of parts.

Another source of difficulty encountered in injection molding machines which utilize a toggle mechanism for developing die locking pressure lies in the excessive stress imparted to the pins connecting the component parts of the toggle mechanism.

It is the principal object of the present invention to provide a die closing unit for a pressure injection molding machine which will meet the requirements outlined above and overcome the related problems mentioned. More specifically, it is an object of the present invention to provide an improved die closing unit utilizing a symmetrically balanced set of tie rods for withstanding the pressure imparted to the dies through their locking and the subsequent injection of material under pressure.

Another object is to provide a movable die bolster plate mounted and piloted on the tie rods to which plate such locking pressure is imparted at a plurality of points closely adjacent each of such tie rods.

A further object is to provide a toggle mechanism having arms connected to each of such pressure points which may be actuated by a single centrally located piston rod.

Another object is to provide a hydraulic cylinder for actuating such piston rod which is rigidly mounted on a fixed member of the frame.

A further object is to provide an adjustable toggle saddle, mounted and piloted on the tie bars, which will operate as the reaction member for the toggle linkage and which is positioned intermediate the movable die bolster plate and the fixed member of the frame for mounting the hydraulic cylinder.

Another object is to provide reaction blocks on such saddle which are adapted to permit the piston rod, toggle linkage, and movable die bolster plate to move throughout a major portion of the die closing stroke without actuation of the toggle linkage and which will form a seat for the actuation of such linkage during the final die locking portion of the closing stroke thereby permitting a wide range of die opening without the necessity for an excessively large toggle mechanism.

A further object is to provide a symmetrical construction for such toggle saddle which will cause the locking pressure imparted to the reaction blocks to be transmitted equally to each of the tie bars.

Another object is to provide a threaded portion on each of the tie bars and a mating internally threaded rotatable sleeve adapted to impart movement to the toggle saddle longitudinally of the tie rods for adjustment thereof.

A further object is to provide gearing from a single adjustment control point to each of the adjustment sleeves whereby each may be actuated simultaneously.

Another object is to provide an adjustable connection between such gearing and the adjustment sleeves to permit the takeup of backlash while the toggle saddle is in a free unstressed condition whereby actuation of the gearing at the control point will impart a precisely coordinated movement to each of the adjustment sleeves and the corresponding portion of the toggle saddle for every adjustment of such saddle to a new set of dies, thereby assuring equal transmission of stress to each of the tie bars upon application of die locking pressure as well as facilitating the rapid adjustment of the toggle saddle position for each new set of dies mounted in the machine.

A further object is to provide an improved toggle linkage which will give a compound mechanical advantage during the locking portion of the die closing stroke and which is adapted to entirely relieve the connecting pins of any thrust pressure when the toggle mechanism has reached its final die locking position.

Another object is to provide tie bars which will remain fixed at all times after the machine is initially set up and which will extend throughout the length of the machine from the fixed die bolster plate through the pressure cylinder bolster plate, the intermediate portions of the tie bars passing through and piloting the movable die bolster plate and the adjustable toggle saddle, whereby reacting pressure for the hydraulic cylinder will be imparted to the extreme end of each of the tie bars while the die locking reactive pressure will be imparted to an intermediate portion of the tie rods depending on the position of the toggle saddle.

A further object is to provide in the toggle saddle a central bore and sleeve for guiding and supporting the toggle actuating piston rod at an intermediate point in its length.

Another object is to provide safety limit rods for preventing the over-travel of the movable die bolster plate and toggle mechanism relative to the toggle saddle in the event the hydraulic pressure means for closing the dies is accidentally actuated when no dies are mounted in the machine or when the toggle saddle is not in its proper position for a particular set of dies mounted in the machine, such rods also serving to engage the crosshead of the toggle actuating piston after the toggle arms have been unlocked thereby forming a portion of the linkage for retracting the die bolster plate during the die opening stroke of such piston.

A further object is to provide a fixed frame for the die closing unit comprising a fixed die bolster plate, a fixed cylinder bolster plate, and a plurality of fixed tie rods extending therebetween with each of the fixed bolster plates supported on a base, all other members of the die closing unit proper being mounted on the tie rods and having no direct contact with the base.

Another object is to provide a die closing unit which is integrally complete with all motors, pumps, accumulators, oil reservoirs, etc. necessary to the operation of the unit in the base thereof in line within the longitudinal confines of this portion of the complete injection molding machine and otherwise adapted to the interchangeable use of a variety of injection units required for various types of materials such as used in metal die casting, plastic molding, and other pressure injection molding operations.

These and other objects of the invention will appear more clearly from the following detailed description of a particular embodiment and from an examination of the drawings forming a part hereof wherein, Fig. 1 is a side elevation of the die closing unit half-sectioned in part along the center line of symmetry of the machine and showing broken section views of numerous component parts.

Fig. 2 is a plan view of the die closing unit sectioned in a manner similar to Fig. 1.

Figure 1:
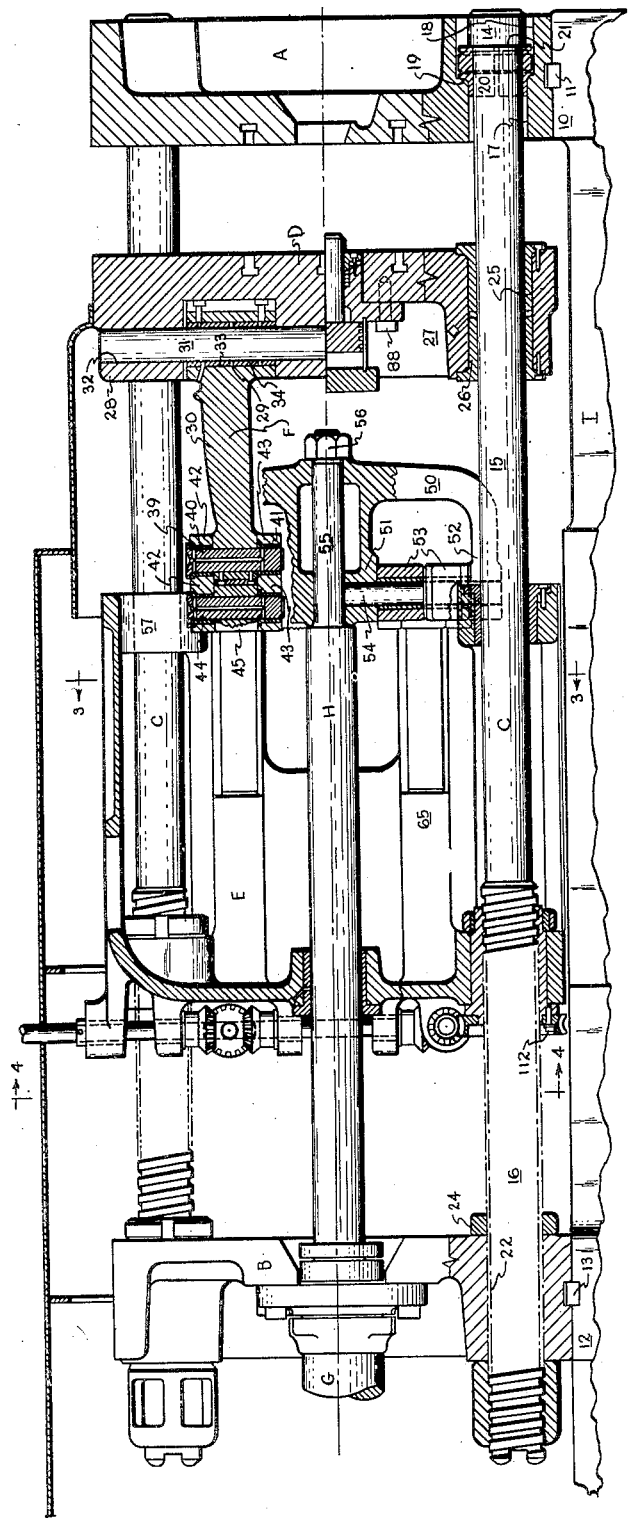

Referring to Figs. 1 and 2, the major components of the die closing unit include the fixed frame comprising a fixed die bolster plate A, a cylinder die bolster plate B, and four equally spaced tie bars C extending between the bolster plates A and B, a movable die bolster plate D piloted on each of the four tie bars C, an adjustable toggle saddle E, a toggle mechanism F, hydraulic cylinder G, central piston rod H, and the base of the unit I, this base being largely omitted from the views. The fixed die bolster plate A rests on the forward end 10 of the base I being located by a key 11.

The cylinder die bolster plate B similarly rests on the rear end 12 of the base I being located by a key 13. The base I is utilized solely for providing vertical support of the fixed frame, such frame being self-contained with respect to all forces set up by the die closing operations. The movable die bolster plate D which is piloted on the tie bars C is moved into closing position by the operation of the toggle mechanism F. Such toggle mechanism is actuated by the piston rod H through hydraulic pressure admitted to the cylinder G. As will hereinafter be described in detail, the toggle saddle E operates as a reaction member for the toggle mechanism F only during the last portion of the closing stroke wherein locking of the dies under pressure takes place. Throughout the major portion of the die opening and closing stroke, the movable die bolster plate D, the toggle mechanism F and piston rod H move together without articulation at the joints of the toggle mechanism. The toggle saddle E is adjustably positioned on the tie bars C to suit each set of dies used in the machine and die locking pressure is transmitted from the movable die bolster plate D through the toggle mechanism F and toggle saddle E to the tie bars C.

The four cylindrical tie bars C which are used in the present embodiment are each identical in construction and comprise a head 14 at the fixed die bolster plate end, a smoothly machined shank 15 and a threaded portion 16 at the rear end of the machine. The fixed die bolster plate is provided with four bores 17 somewhat larger in diameter than the shank 15 of the tie rods through one of which each of the tie rods extends and with a counterbore 18 forming a shoulder 19 against which a collared sleeve 20 is adapted to seat, the head of the tie bar 14 in turn seating against the outer surface 21 of the sleeve 20. The threaded portion 16 of each of the tie bars C extends through a cylindrical bore 22 in the cylinder bolster plate and a reaction nut 23 threaded on the end of each tie bar seats against the rear face of the cylinder bolster plate. A lock nut 24 is provided to bear against the forward face of the cylinder bolster plate after the tie bar and reaction nuts are properly positioned in order to prevent any turning of the tie bars once the machine has been set up.

The movable die bolster plate D is provided with four longitudinal cylindrical bores 25 and a pair of collared bushings 26 which serve to mount and pilot such bolster plate on the four tie bars. A cavity 27 is cast in the rear face of the movable die bolster plate D as well as a pair of vertical cylindrical columns 28 spaced somewhat inwardly from the bores 25 and extending from the top to the bottom of the bolster plate. Each of the columns 28 is provided with a cutout portion to receive the connecting ends 29 of an upper and lower toggle arm 30, only one of which is shown in the drawings. A cylindrical pin 31 extends vertically through the entire length of the columns 28 within the cylindrical bore 32 provided in such columns as well as through the cylindrical bore 33 provided in each of the ends 29 of the toggle arms 30, sleeve bushings 34a being interposed within the bores 33 to provide a suitable bearing surface for articulation of the toggle arms 30 about the pins 31. A bearing block 34 is seated in a recess 35 provided in the extreme end of each toggle arm 30, such bearing block having its outer surface 36 curved as a segment of a cylinder having a center coincident with the center of the pin 31 and which is adapted to slide on a mating arcuate surface formed in the bolster plate upon articulation of the toggle arm 30. A second toggle arm 37 is formed at its outer end 38 as a yoke which is attached to the rearward end of the toggle arm 30 by means of a pin 39, collared bushings 40, 41 being interposed between the pin 39 and the cylindrical bore in each of the yoke members 42, 43. An additional pin 44 is similarly seated on the other side of the yoke end 38 serving to secure a cylindrical sleeve 45 between the yoke members 42, 43. The sleeve 45, when the toggle mechanism F is in closed position as shown in the drawings, is adapted to seat against the surfaces 46, 47 in the reaction block 48 which is in turn seated in the toggle saddle E. A bearing block 49 is seated in a recess in the rearward end of the toggle arm 30 and is provided with a curved surface which comes into engagement with the sleeve 45 when the toggle mechanism has reached a closed position. Such closed position is reached when the three pins 31, 39 and 44 are in alignment and the bearing block 49 serves to limit the actuation of the toggle mechanism to such aligned position. Thus, it may be seen that when the toggle mechanism is fully closed and the dies, not shown, are in locked position under pressure, the pressure is transmitted from the movable die bolster plate to each of the reaction blocks in the toggle saddle by way of the bearing block 34, toggle arm 30, bearing block 49, and sleeve 45. At such time the principal stress on each of the pins 31, 39 and 44 is substantially relieved due to the action of the bearing blocks 34 and 49 in absorbing the load.

The inner end of each toggle arm 37 is pivotally attached to a vertically extending yoke member or cross-head 50, which latter member is provided with a central rearwardly extending portion 51 as well as outer arms 52, only one of which is shown in the drawings. Between the central portion 51 and the outer arms 52 of the crosshead 50, space is provided to accommodate the inner ends 53 of two toggle arms 37, each of such toggle arms extending laterally in an opposite direction and being formed with an opposite offset construction whereby their yoke ends 38 may lie in the same position relative to a horizontal plane while the inner ends 53 will overlap each other and may thereby be secured to the crosshead 50 by a pair of aligned pins 54. The piston rod H is provided with a reduced end section 55 which passes through a central bore in the crosshead 50 being firmly secured thereto by a nut 56.

Thus, it is seen that four toggle units in all are provided adapted to apply pressure to the movable die bolster plate at four points symmetrically spaced somewhat inwardly relative to the four tie bars, and two laterally spaced pins 31 each serve to secure two of the outer ends 29 of the toggle arms 30 to the movable die bolster plate, while two pins 54 parallel to the pins 31 and in alignment with respect to each other serve to connect the inner ends 53 of the toggle arms 37 to the yoke 50 actuated by the piston rod H.

Figure 3:
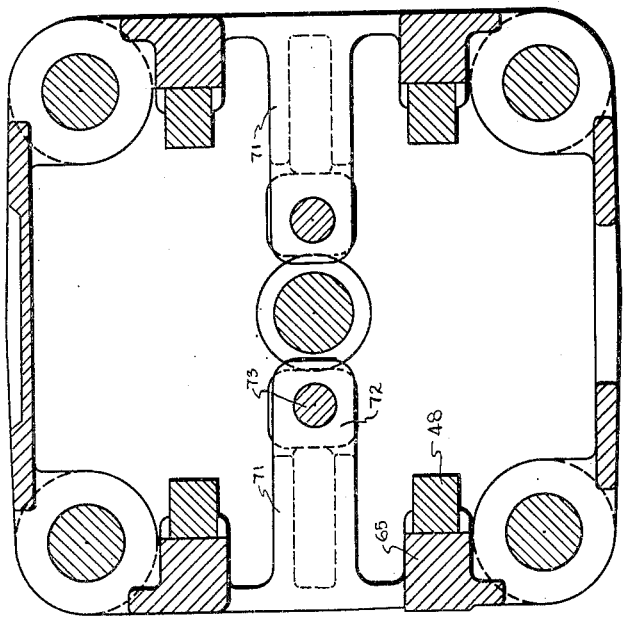
Fig. 3 is a sectional view taken along the line 3—3 of Fig. 1.

The four reaction blocks 48 are each symmetrically arranged and seated in the toggle saddle E. The toggle saddle, the cross section of which is shown in Fig. 3, comprises a box-like structure having an open forward end and built up at each corner to accommodate the longitudinal bore through which the tie rods pass. At each of the forward corners 57 a collared bushing 58 is provided which is adapted to pilot the forward end of the toggle saddle on the reduced shank 15 of each tie bar C. At each of the rear corners 59 of the toggle saddle a somewhat larger bore is provided to rotatably mount an internally threaded sleeve 60 which is adapted to engage the threaded portion 16 of each of the tie bars. The sleeve 60 is provided with a collar 61, a threaded end 62 and nut 63 adapted to bear against the ends 59 of the toggle saddle in order to transmit reaction thrust from the toggle saddle to the threaded portion 16 of the tie rods upon locking of the dies as well as to transmit longitudinal movement to the toggle saddle in adjusting the same upon rotation of the threaded sleeve 60. A worm gear 64 is bolted to each of the sleeves 60 and gearing 65 to be hereinafter more fully described is provided to rotate the worm gear 64 and sleeve 61 at each of the tie rods in response to the actuation of a single lever. Running between the forward and rear ends of the toggle saddle at each corner an integrally cast longitudinal member 65 is provided as a seat for the reaction blocks 48 which bear against the perpendicular surfaces 66, 67 formed in such member and are held in position by studs 68.

The line of action of the locking pressure transmitted by the toggle mechanism F to the reaction blocks 48 is such as to pass diagonally through the reaction blocks and the longitudinal member 65 and to intersect a vertical plane passing through each of the tie bars at approximately the center of each of the threaded sleeves 60. At the center of the rear end of the toggle saddle E an integrally formed cylindrical member 69 is provided which, with the bushing 70, serves to support and guide the piston rod H throughout its operating stroke. Centrally located in a horizontal plane a pair of integrally formed corner members 71 are provided with inwardly projecting lugs 72, each having a longitudinal bore 73 and bushing 74 adapted to pilot a pair of stop rods 75. Such rods are also piloted in bore 76 and a bushing 77 located in a laterally extending member 77a of the crosshead 50, and at their forward ends such rods are connected to the movable bolster plate D by a threaded attachment 78 as shown in the drawings. The rear ends of the rods 75 are each provided with a head 79 normally having a slight clearance 80 preventing engagement with the rear surface of the lug 72 when the movable die bolster plate B is in a proper die locking position relative to the toggle saddle E, as shown in Fig. 1. Such stop rods operate to prevent over-travel of the movable die bolster plate D relative to the toggle saddle E in the event that the piston rod H is actuated when the dies are removed or when the toggle saddle is not adjusted to its proper position for a given set of dies which might be in the machine. During the die opening stroke of the piston rod H, the member 77a slides back along the stop rod 75 until the bushing 77 engages the shoulder 77b in such rod. By this time the toggle arms 30, 37 will have reached the unlocked position shown in broken line in Fig. 2 where they will be free to clear the reaction block 48. Further backward movement of the piston rod H then operates through the stop rods 75 to retract the die bolster plate D and toggle mechanism F without further pivotal movement of the toggle arms 30, 37.

In the center of the movable die bolster plate D a knockout piston assembly is provided for ejection of the castings upon opening of the dies. Such assembly comprises a piston rod 81, piston 82, cylinder wall 83, cylinder head 84 and cylinder end 85. The latter member fits within a bore 86 in the die bolster plate and is provided with a collar 87 which is secured to the die bolster plate by studs 88 as shown in Fig. 2. The cylinder wall 83 is seated in annular grooves in the head 84 and collar 87 and is secured in such position by a plurality of studs passing through the head 84 and into the collar 87, such studs not being shown in the drawings. The stroke of the piston 82 is fixed by the length of the cylinder wall 83. However, the effective stroke of the piston rod 81 which is threaded into the piston 82 is adjustable by such threaded connection to any position from zero to its maximum stroke.

Figure 4:
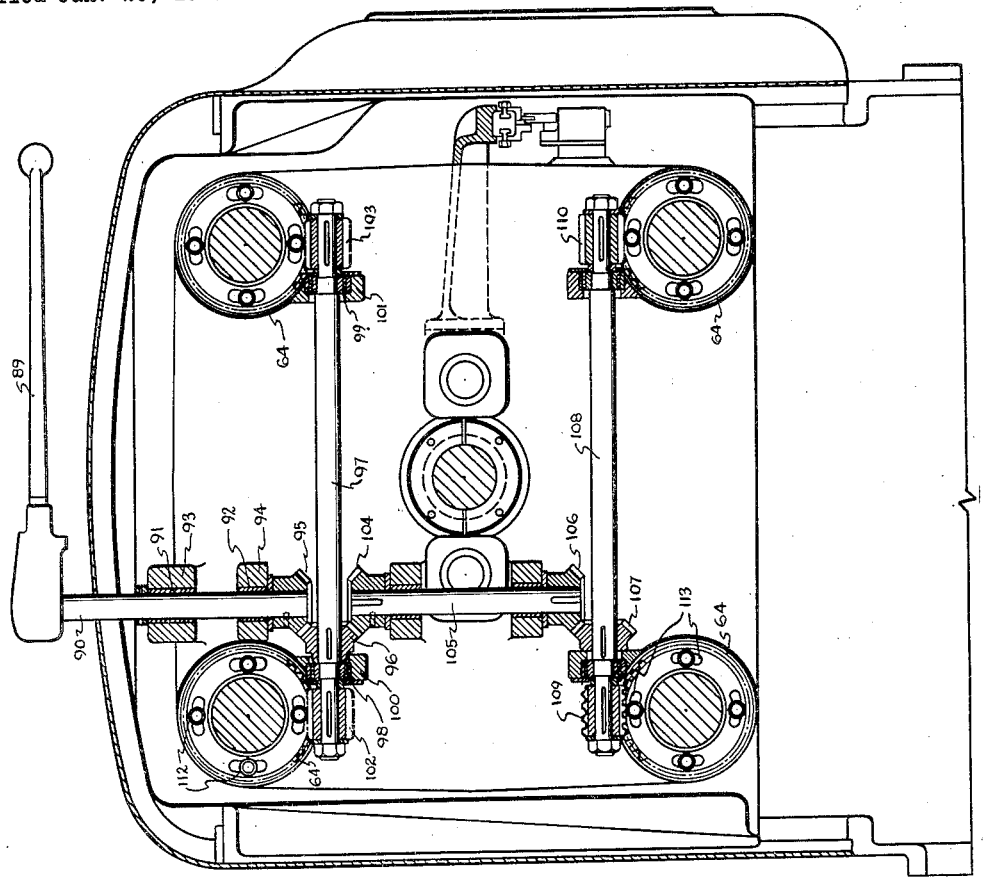
Fig. 4 is a sectional view taken along the line 4—4 of Fig. 1.

The gearing for adjusting the toggle saddle, as most clearly shown in Fig. 4, is actuated by a lever arm 89 which is connected to the top end of the vertical shaft 90 by a reversible ratchet assembly. The shaft 90 rotates in a pair of bearings 91, 92 seated in bracket members 93, 94 integrally cast on the rear end of the toggle saddle E. The shaft 90 drives a bevel gear 95 which in turn drives a bevel gear 96 and shaft 97. The latter shaft extending transversely between the upper tie rods C rotates in a pair of ball bearings 98, 99 which are seated in brackets 100, 101 likewise integrally formed at the rear end of the toggle saddle E. Worms 102, 103 are positioned at either end of the shaft 97 to engage and drive the worm gears 64. The lower side of the bevel gear 96 drives a bevel gear 104 rotating shaft 105 in the opposite direction as that of shaft 90. The bevel gear 106 at the lower end of shaft 105 in turn drives bevel gear 107 rotating shaft 108 and worms 109, 110 in a direction opposite to that of shaft 97 and worms 102, 103. The worms 109, 110 in turn drive the lower worm gears 64, and since they drive the top of such worm gears, effect a rotation of the latter gears in the same direction as the upper worm gears 64.

An annular recess 111, as shown in Fig. 2, is formed in each of the worm gears 64 to accommodate the heads of a plurality of studs 112 which serve to secure the worm gear to the internally threaded sleeve 60. Arcuate slots 113 in the worm gear 64 permit a limited rotation of the worm gear 64 relative to the sleeve 60. Such rotation in turn permits a takeup in the backlash between the actuated gearing and each of the worm gears 64 in a manner such as to provide for precise coordination of the movement of each of the threaded sleeves 60 in response to the actuation of the lever 89 with resultant equal locking pressure transmitted to each of the four corners of the toggle saddle E and the associated tie bars C following any adjustment of the position of the toggle saddle for different sets of dies used in the machine. The backlash adjustment is made when the machine is initially set up and any further adjustment thereof is not necessary for varying the position of the toggle saddle when the machine is once in operation.

The manner of making the backlash adjustment may be explained as follows:

After the fixed die bolster plate A and cylinder bolster plate B have been positioned on the bed of the machine and the tie bars C have been drawn to a snug position and permanently locked in such position, the nuts 63 are drawn tight against the shoulders 114 of each sleeve 60 and the sleeves are then individually rotated to bear with even pressure against the members 59 of the toggle saddle, such saddle being in a free position without any strain imparted thereto. With all the studs 112 loosened sufficiently to permit rotation of the worm gears without movement of the sleeves 60, the lever arm 89 is actuated for a sufficient distance to take up the backlash in all of the gearing leading to the worm gears and to impart a slight movement to each of the worm gears 64 themselves. The studs are thereupon tightened locking each worm gear in a permanent position relative to the sleeve 60 such as to provide precise simultaneous actuation thereof.

When the toggle saddle has been so adjusted, a set of test dies may be mounted between the die bolster plates A and D and the toggle mechanism F actuated to its locked position with the toggle saddle E in such a position as to result in light pressure being applied to the reaction blocks 48. The reaction blocks 48 may then be loosened and shimmed to provide accurately uniform pressure at each of the toggle connections and thereupon permanently set for subsequent operations.

In order to adjust the toggle saddle E for a particular set of dies and for maximum closing pressure, the saddle is moved by the lever 89 to an approximate position somewhat forward of the anticipated final position, hydraulic pressure thereupon being introduced to the cylinder G, to actuated piston H and toggle mechanism F. If it is found that the toggle mechanism will not completely close to a locked position, the saddle may then be progressively moved backwards in small increments until a position is reached where the toggle mechanism will fully lock.

It may be seen from the above description and by reference to the drawings that the toggle saddle E may be adjusted for die space between the minimum die space position as shown in the drawings and a maximum die space position wherein the rear end of the toggle saddle E is closely adjacent the forward face of the cylinder bolster plate B. It will also be seen that the maximum die opening space, which is the same for any position of the toggle saddle E, is not limited by the construction of the toggle mechanism, but rather by the space between the forward face of the toggle saddle E and the rear face of the movable die bolster plate D.

When the movable die bolster plate D is retracted to open the dies, reverse movement of the piston rod H first results in the breaking of the toggle mechanism F to a position such as indicated by the broken line view in Fig. 1. As the piston rod continues to move back, the die bolster plate D, toggle mechanism F and piston rod H move in unison without further articulation at the toggle mechanism joints. When the piston H is then actuated for die closing, the sleeves 45 of the toggle mechanism come in contact with the inner surfaces 115 of the reaction blocks 48 and ride along such surfaces until they have moved forward a sufficient distance to drop into the corner seat formed by the surfaces 46, 47 in the reaction block 48. As the piston rod H then continues to move forward, the toggle mechanism is actuated to its die locking position. The dimensions of the pressure cylinder G and piston rod H are such as to accommodate a full opening and closing stroke for any position of the toggle saddle.

A compound mechanical advantage capable of producing a tremendous die closing pressure with a relatively moderate hydraulic piston actuating pressure is incorporated in each of the four toggle mechanism units. Such mechanical advantage is derived from the fact that as each toggle mechanism unit approaches its die locking position, the torque tending to rotate the toggle arm 37 about the seated sleeve 45 is derived from the force of the piston rod H acting on a moment arm substantially equal to the length of the toggle arm 37 while the torque resisting such rotation is derived from a force acting on the relatively short moment arm equal to the distance between the pins 39 and 44, and from the further fact that the only effective force acting on said latter moment arm is that component of the closing pressure which may be considered as acting on a line perpendicular to the line joining the centers of the pins 39 and 44, which component approaches zero as the pin 39 approaches alignment with the pins 31 and 44.

While the details of the base and the pumps, accumulator, oil reservoir and the like required for the operation of the die closing unit have been omitted from the drawings, it may be seen that an integral self-contained die closing unit is provided having its own separate base limited to the length of the die closing unit and otherwise adapted to the use of separate interchangeable injection units (such injection units forming the subject matter of separate patent applications) whereby the manufacture of metal, plastic and other pressure injection products requiring different types of injection units may be accomplished without repeating the cost of the die closing unit for each product.

Thus, it is seen that each of the objects outlined herein is met in the present embodiment. While such embodiment has been described in detail above, it will be readily understood that numerous modifications are possible without departing from the scope of the invention as set forth in the appended claims.

We claim:

1. In combination in a pressure injection molding machine, a fixed die bolster plate, a fixed pressure cylinder bolster plate, a plurality of parallel tie bars extending therebetween and connected thereto, a movable die bolster plate mounted and piloted on said tie bars, a toggle mechanism operatively connected to said movable die plate, a fluid pressure cylinder rigidly connected to said cylinder bolster plate, a piston actuated by fluid pressure within said cylinder for actuating said toggle mechanism, and an adjustable toggle saddle mounted to react against and piloted on said tie bars intermediate said movable die and fixed cylinder plates and adapted to form a reactive member for operation of said toggle mechanism.

2. A pressure injection molding machine comprising a fixed die bolster plate, a fixed rear bolster plate, a plurality of parallel tie bars extending therebetween and connected thereto, a movable die bolster plate mounted and piloted on said tie bars, a toggle mechanism operatively connected to said movable die plate, a toggle saddle mounted and piloted on said tie bars intermediate said movable die and fixed rear plates and adapted to form a reaction member in the operation of said toggle mechanism, a threaded portion on each of said tie bars, an internally threaded member for engaging each of said threaded portions rotatably seated in said toggle saddle and adapted upon rotation to impart longitudinal movement to said toggle saddle, means for simultaneously rotating each of said members in order to adjust die space for different sized dies, and means for actuating said toggle mechanism.

3. A pressure injection molding machine comprising a fixed die bolster plate, a fixed rear bolster plate, a plurality of parallel tie bars extending therebetween and connected thereto, a movable die bolster plate mounted and piloted on said tie bars, a toggle mechanism operatively connected to said movable die plate, a toggle saddle mounted and piloted on said tie bars intermediate said movable die and fixed rear plates and adapted to form a reaction member in the operation of said toggle mechanism, a threaded portion on each of said tie bars, an internally threaded member for engaging each of said threaded portions rotatably seated in said toggle saddle and adapted upon rotation to impart longitudinal movement to said toggle saddle, means for simultaneously rotating each of said members in order to adjust die space for different sized dies, and pressure means adapted to react against said fixed rear plate for actuating said toggle mechanism.

4. A pressure injection molding machine comprising a fixed die bolster plate, a fixed rear bolster plate, a plurality of parallel tie bars extending therebetween and connected thereto, a movable die bolster plate mounted and piloted on said tie bars, a toggle mechanism operatively connected to said movable die plate and adapted to be actuated by pressure applied to a centrally located portion of said toggle mechanism, an adjustable toggle saddle mounted and piloted on said tie bars intermediate said movable die and fixed rear plates and adapted to form a reaction member in the operation of said toggle mechanism, a rod piloted through a central portion of said toggle saddle and connected to said centrally located portion of said toggle mechanism for actuating the same, and pressure means adapted to react against said rear bolster plate for actuating said rod.

5. A pressure injection molding machine comprising a fixed die bolster plate, a fixed rear bolster plate, a plurality of parallel tie bars extending therebetween and connected thereto, a movable die bolster plate mounted and piloted on said tie bars, a toggle mechanism operatively connected to said movable die plate, a toggle saddle mounted and piloted on said tie bars intermediate said movable die and fixed rear plates and adapted to form a reaction member in the operation of said toggle mechanism, a threaded portion on each of said tie bars, an internally threaded member for engaging each of said threaded portions rotatably seated in said toggle saddle and adapted upon rotation to impart longitudinal movement to said toggle saddle, a gear connected to each of said members, connecting gearing operative to simultaneously rotate each of said gears equally upon actuation at a single control point, and means for actuating said toggle mechanism.

6. A pressure injection molding machine comprising a fixed die bolster plate, a fixed rear bolster plate, a plurality of parallel tie bars extending therebetween and connected thereto, a movable die bolster plate mounted and piloted on said tie bars, a toggle mechanism operatively connected to said movable die plate, a toggle saddle mounted and piloted on said tie bars intermediate said movable die and fixed rear plates and adapted to form a reaction member in the operation of said toggle mechanism, a threaded portion on each of said tie bars, an internally threaded member for engaging each of said threaded portions rotatably seated in said toggle saddle and adapted upon rotation to impart longitudinal movement to said toggle saddle, a gear connected to each of said members, connecting gearing operative to simultaneously rotate each of said gears equally upon actuation at a single control point, adjustable means for permitting any backlash between said gearing and said threaded members to be taken up during the initial setting up of the machine while said saddle is free of any stress imparted through said threaded members whereby the actuation of said gearing may be caused to produce precisely coordinated rotation of each of said threaded members and movement of the associated portion of said saddle.

7. A die closing unit for a pressure injection molding machine comprising a fixed die bolster plate, a fixed cylinder bolster plate and cylinder mounted thereon, a plurality of tie bars extending between said bolster plates and connected thereto, a movable die bolster plate mounted and piloted on said tie bars, a toggle mechanism pivotally connected to said movable die bolster plate, a piston and piston rod actuated by pressure in said cylinder, said piston rod being pivotally connected to said toggle mechanism, an adjustable toggle saddle mounted to react against and piloted on said tie bars, reaction members in said toggle saddle, said toggle mechanism and reaction members being arranged in a manner whereby said toggle mechanism will seat against said reaction members during the last portion of a die closing stroke and thereupon be actuated by the movement of said piston rod to lock the dies under pressure, said toggle mechanism and movable die bolster plate being moved in unison with said piston rod during the initial portion of the die closing stroke without actuation of said toggle mechanism.

8. A die closing unit as set forth in claim 7 wherein a central bore in said toggle saddle serves to pilot said piston rod during its movement relative to said toggle saddle.

9. In a die closing unit for a pressure injection molding machine having fixed and movable die bolster plates, a frame for reactively absorbing die closing pressure established therebetween, and a reaction unit adjustably connected to said frame; four reaction members symmetrically and transversely spaced in said reaction unit relative to the longitudinal center line of said die closing unit and adapted to form seats for the operation of a die closing toggle mechanism, a toggle mechanism characterized by four toggle units each comprising a pair of toggle arms pivotally connected to each other at one end, a centrally located actuating member, the outer ends of the toggle arms of each toggle unit being pivotally connected respectively to said actuating member and to said movable die bolster plate, the pivotal connection of each toggle arm with said actuating member having an axis common to all toggle units which intersects the center line of the die closing unit, the pivotal connection of each toggle arm with said movable die bolster plate having an axis coincident with one or the other of a pair of axes parallel to said first-mentioned axis and laterally spaced an equal distance from said center line, each of said pair of axes being common to the pivotal connection of two of said toggle units, and each toggle arm connected to said actuating member being adapted adjacent the first-mentioned pivotal connection to engage one of said seats during the final portion of a die closing operation whereafter the movement of said actuating member toward said movable die bolster plate will result in the arcuate movement of such pivotal connection about a center established by such seat and in a direction approaching alignment with said center and the pivotal connection at said movable die bolster plate, said actuating member pivotally connected to all of the toggle units comprising an E-shaped yoke with the central leg adapted to connect to an actuating piston rod, the ends of each of the legs being provided with a bore adapted to receive a connecting pin and having a common axis, the connecting ends of two toggle arms being adapted to overlap and fit within the center leg and one of the outer legs of said member, and a connecting pin seated in the bore of the central leg and one of the outer legs passing through said connecting ends of two toggle arms serving thereby to pivotally connect such arms on a common axis.

10. In a die closing unit for a pressure injection molding machine having a fixed die bolster plate, a fixed rear bolster plate, a plurality of parallel partially threaded tie bars extending therebetween and connected thereto, a movable die bolster plate mounted and piloted on said tie bars, a toggle mechanism connected to said movable die bolster plate and actuating means therefor; an adjustable toggle saddle mounted and piloted on said tie bars adapted to operate as a reaction unit for transmitting die closing pressure from said toggle mechanism to said tie bars, said toggle saddle being characterized by a plurality of longitudinal bores through which said tie bars pass, an internally threaded sleeve rotatably seated in each of said bores for engaging the threaded portion of one of said tie bars, said sleeves being adapted upon simultaneous rotation to impart longitudinal movement to said saddle as required in adjusting its position for a particularly set of dies as well as to transmit reactive die closing pressure from said saddle to said tie bars during the operation of the machine.

11. In a die closing unit for a pressure injection molding machine having a fixed die bolster plate, a fixed rear bolster plate, a plurality of parallel partially threaded tie bars extending therebetween and connected thereto, a movable die bolster plate mounted and piloted on said tie bars, a toggle mechanism connected to said movable die bolster plate and actuating means therefor; an adjustable toggle saddle mounted and piloted on said tie bars adapted to operate as a reaction unit for transmitting die closing pressure from said toggle mechanism to said tie bars, said toggle saddle being characterized by a plurality of longitudinal bores through which said tie bars pass, an internally threaded sleeve rotatably seated in each of said bores for engaging the threaded portion of one of said tie bars, said sleeves being adapted upon simultaneous rotation to impart longitudinal movement to said saddle as required in adjusting its position for a particular set of dies as well as to transmit reactive die closing pressure from said saddle to said tie bars during the operation of the machine, and a reaction seat in said saddle adjacent in transverse relationship to each of said tie bars for reactively engaging said toggle mechanism during the final portion of a die closing operation.

12. In a die closing unit for a pressure injection molding machine having a fixed die bolster plate, a fixed rear bolster plate, a plurality of parallel partially threaded tie bars extending therebetween and connected thereto, a movable die bolster plate mounted and piloted on said tie bars, a toggle mechanism connected to said movable die bolster plate, a hydraulic cylinder mounted on said fixed die bolster plate, and a piston rod operated by fluid pressure in said cylinder for actuating said toggle mechanism; an adjustable toggle saddle mounted and piloted on said tie bars adapted to operate as a reaction unit for transmitting die closing pressure from said toggle mechanism to said tie bars, and a mechanism limiting the separation of said movable die bolster plate and said toggle saddle for limiting the forward stroke of said piston rod and movable die bolster plate beyond the normal die locking position.

13. In a die closing unit for a pressure injection molding machine having a fixed die bolster plate, a fixed rear bolster plate, a plurality of parallel partially threaded tie bars extending therebetween and connected thereto, a movable die bolster plate mounted and piloted on said tie bars, a toggle mechanism connected to said movable die bolster plate, a hydraulic cylinder mounted on said fixed die bolster plate, and a piston rod operated by fluid pressure in said cylinder for actuating said toggle mechanism; an adjustable toggle saddle mounted and piloted on said tie bars adapted to operate as a reaction unit for transmitting die closing pressure from said toggle mechanism to said tie bars, and a mechanism limiting the separation of said movable die bolster plate and said toggle saddle for limiting the forward stroke of said piston rod and movable die bolster plate beyond the normal die locking position comprising a positive stop rod secured to said movable die bolster plate, and cooperating abutting surfaces in said stop rod and said toggle saddle which came into engagement after said movable die bolster plate has moved past its normal die locking position relative to said toggle saddle.

14. In a die closing unit for a pressure injection molding machine having a fixed die bolster plate, a fixed rear bolster plate, four symmetrically spaced parallel partially threaded tie bars extending therebetween and connected thereto, a movable die bolster plate mounted and piloted on said tie bars, a toggle mechanism connected to said movable die bolster plate and actuating means therefor; an adjustable toggle saddle mounted and piloted on said tie bars adapted to operate as a reaction unit for transmitting die closing pressure from said toggle mechanism to said tie bars, said toggle saddle being characterized by a box-like construction with built-up corner sections, parallel longtiudinal bores passing through each of said built-up corner sections, the four forward bores being adapted to pilot said toggle saddle on unthreaded portions of said tie bars, the four rearward bores providing journals, internally threaded sleeves rotatable in said journals adapted to engage threaded portions of said tie bars, four built-up sections extending longitudinally between said corner sections adapted to form reaction seats for the operation of said toggle mechanism, each being transversely adjacent one of said tie bars.

15. A toggle saddle as set forth in claim 14 having gearing actuated at a single control point adapted to simultaneously rotate said sleeves for adjusting the position of said toggle saddle.

16. In a die closing unit for a pressure injecttion molding machine having a fixed frame including a fixed die bolster plate, a movable die bolster plate, a toggle mechanism connected to said movable die bolster plate, an adjustable toggle reaction member engaged by said toggle mechanism during the final portion of a die closing stroke and adapted to transmit die closing pressure from said toggle mechanism to said fixed frame, a piston rod for actuating said toggle mechanism adapted to unlock and move said toggle mechanism to a position free of said reaction member during the initial portion of a die opening stroke, a crosshead fixed to said piston rod, a rod fixed to said movable die bolster plate piloted in said crosshead during the actuation of said toggle mechanism, said latter rod and crosshead being provided with engaging surfaces operative during the final die opening stroke of said piston rod to directly couple said piston rod with said movable die bolster plate for imparting retractive movement thereto.

17. In a die closing unit as set forth in claim 13, a crosshead fixed to said piston rod, said stop rod and crosshead being provided with engaging surfaces operative during the final die opening stroke of said piston rod to directly couple said piston rod with said movable die bolster plate for imparting retractive movement thereto.

ARTIE C. CARLSON.
FRED W. CREW.

REFERENCES CITED

The following references are of record in the file of this patent:

UNITED STATES PATENTS

| Number | Name | Date |
|---|---|---|
| 2,252,107 | Weida | Aug. 12, 1941 |
| 2,287,417 | De Mattia | June 23, 1942 |
| 2,309,460 | Lester | Jan. 26, 1943 |
| 2,371,547 | Rosenlund et al. | Mar. 13, 1945 |